US012626387B2

(12) United States Patent
Vepakomma et al.

(10) Patent No.: US 12,626,387 B2
(45) Date of Patent: May 12, 2026

(54) METHOD AND SYSTEM FOR AUTOMATICALLY DETERMINING DIMENSIONS OF A CARTON BOX

(71) Applicant: Wipro Limited, Bangalore (IN)

(72) Inventors: Navya Vepakomma, Bangalore (IN); Yadhunandan Ullam Subbaraya, Bangalore (IN)

(73) Assignee: Wipro Limited, Bangalore (IN)

( * ) Notice: Subject to any disclaimer, the term of this patent is extended or adjusted under 35 U.S.C. 154(b) by 268 days.

(21) Appl. No.: 18/484,940

(22) Filed: Oct. 11, 2023

(65) Prior Publication Data

US 2025/0078302 A1 Mar. 6, 2025

(30) Foreign Application Priority Data

Aug. 29, 2023 (IN) .............................. 202341057807

(51) Int. Cl.
*G06T 7/50* (2017.01)
*G06T 7/12* (2017.01)
(Continued)

(52) U.S. Cl.
CPC .................. *G06T 7/62* (2017.01); *G06T 7/12* (2017.01); *G06T 7/50* (2017.01); *G06T 7/73* (2017.01);
(Continued)

(58) Field of Classification Search
CPC .... G06T 7/62; G06T 7/12; G06T 7/50; G06T 7/73; G06T 2207/20084;
(Continued)

(56) References Cited

U.S. PATENT DOCUMENTS

2019/0026898 A1* 1/2019 Ackley ................ G06K 7/1491
2019/0213389 A1* 7/2019 Peruch ...................... G06T 7/12
(Continued)

OTHER PUBLICATIONS

Yang, Heran, et al. "Inferring 3d articulated models for box packaging robot." arXiv preprint arXiv:1106.4632 (2011). (Year: 2011).*

(Continued)

*Primary Examiner* — Gregory A Morse
*Assistant Examiner* — Renae A Bitor
(74) *Attorney, Agent, or Firm* — Finnegan, Henderson, Farabow, Garrett & Dunner, LLP

(57) ABSTRACT

Embodiments of present disclosure relates to method and dimension determination system for determining dimensions of carton box. The dimension determination system receives plurality of datapoints associated with open carton box. The dimension determination system extracts depth datapoints from plurality of datapoints for identifying plurality of flaps. The dimension determination system determines height of open carton box using depth datapoints. The dimension determination system generates contour and estimates rectangle figure for contour of open carton box. Further, the dimension determination system determines width and length by extracting vertices of rectangle figure. Thereafter, the dimension determination system utilises width, length and height to obtain dimensions of open carton box. Thus, the present disclosure automatically determines dimensions of carton box.

15 Claims, 5 Drawing Sheets

(51) Int. Cl.

| | |
|---|---|
| *G06T 7/62* | (2017.01) |
| *G06T 7/73* | (2017.01) |
| *G06V 10/44* | (2022.01) |
| *G06V 10/74* | (2022.01) |
| *G06V 10/762* | (2022.01) |
| *G06V 10/776* | (2022.01) |
| *G06V 10/82* | (2022.01) |

(52) U.S. Cl.
CPC .............. *G06V 10/44* (2022.01); *G06V 10/74* (2022.01); *G06V 10/762* (2022.01); *G06V 10/776* (2022.01); *G06V 10/82* (2022.01); *G06T 2207/20084* (2013.01)

(58) Field of Classification Search
CPC ........... G06T 2207/10024; G06T 2207/10028; G06V 10/44; G06V 10/74; G06V 10/762; G06V 10/776; G06V 10/82
See application file for complete search history.

(56) References Cited

U.S. PATENT DOCUMENTS

2020/0324973 A1    10/2020  Edwards et al.
2024/0404091 A1 *  12/2024  Zhu ........................ G06T 7/149

OTHER PUBLICATIONS

"Leveraging Advanced 3D Measurement for Packaging & Logistics Applications", FactorySmart by LMI Technologies, https://lmi3d.com/company/digital-hub/blog/leveraging-advanced-3d-measurement-packaging-logistics-applications, Oct. 1, 2020.

Peng et al., "Portable System for Box Volume Measurement Based on Line-Structured Light Vision and Deep Learning", Sensors, vol. 19, No. 18, https://www.mdpi.com/1424-8220/19/18/3921/htm, Sep. 11, 2019, 23 pages.

"Box-Scan: An efficient and effective algorithm for box dimension measurement in conveyor systems using a single RGB-D camera", 7th IIAE International Conference on Industrial Application Engineering, 2019, 9 pages.

* cited by examiner

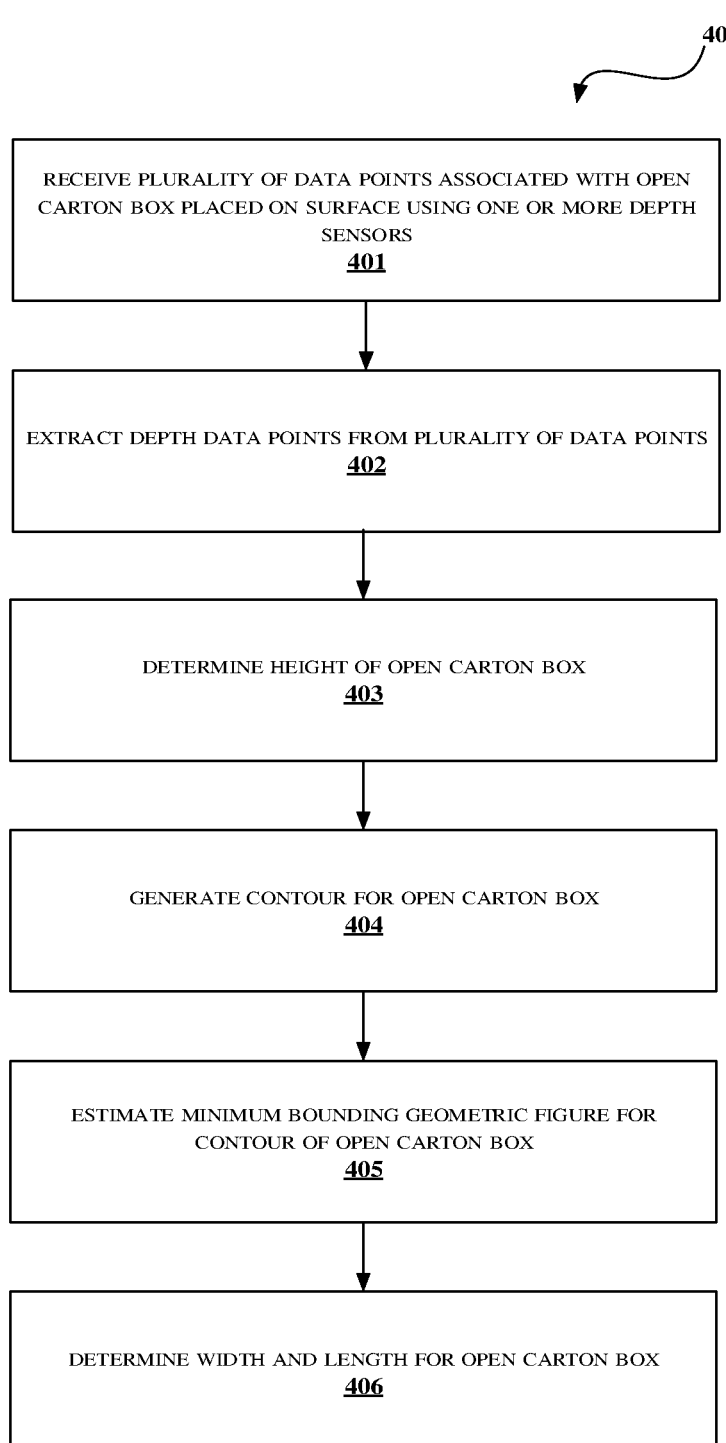

400

RECEIVE PLURALITY OF DATA POINTS ASSOCIATED WITH OPEN
CARTON BOX PLACED ON SURFACE USING ONE OR MORE DEPTH
SENSORS
401

EXTRACT DEPTH DATA POINTS FROM PLURALITY OF DATA POINTS
402

DETERMINE HEIGHT OF OPEN CARTON BOX
403

GENERATE CONTOUR FOR OPEN CARTON BOX
404

ESTIMATE MINIMUM BOUNDING GEOMETRIC FIGURE FOR
CONTOUR OF OPEN CARTON BOX
405

DETERMINE WIDTH AND LENGTH FOR OPEN CARTON BOX
406

Figure 4

METHOD AND SYSTEM FOR AUTOMATICALLY DETERMINING DIMENSIONS OF A CARTON BOX

TECHNICAL FIELD

The present subject matter is related in general to packing and logistics industry, more particularly, but not exclusively, the present subject matter relates to a method and system for determining dimensions of a carton box.

BACKGROUND

Generally, warehouse, packaging, and logistics domains deal with carton boxes. Various items which come on a conveyor belt needs to be packed in an efficient manner into the carton boxes. For this purpose, the carton boxes are measured, and the items are packed into the carton boxes based on a volume and dimensions of the carton boxes. However, taking measurements of various carton boxes manually can be extremely time consuming and prone to errors.

Currently, most of the existing systems are used to compute the dimensions of closed carton boxes. Particularly, the dimensions of the closed carton boxes which are present on the conveyor belt are computed by fitting minimum bounding cuboid or by reading machine readable tags which are present on packages. While, in other existing systems, when a closed carton box enters a Region of Interest (ROI), the dimensions of the closed carton box is computed. However, the existing systems are limited to conveyor belt system and do not compute dimensions of an open carton box. Also, the existing systems are limited to computing the dimensions of a single closed carton box at a time and do not support computation of dimensions of multiple open carton boxes in same scene.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of determining dimensions of a carton box. The method comprises receiving a plurality of data points associated with an open carton box placed on a surface using one or more depth sensors. The one or more depth sensors are located vertically above the surface. Upon receiving, the method comprises extracting depth data points from the plurality of data points. The depth data points are clustered based on closeness between the depth data points using a clustering technique to identify a plurality of flaps for the open carton box. The plurality of flaps of the open carton box is represented as three-dimensional coordinate points. Upon extracting, the method comprises determining a height of the open carton box by determining a cross section of the open carton box using the depth data points. Upon determining, the method comprises generating a contour for the open carton box by converting the three-dimensional coordinate points of the plurality of flaps into a two-dimensional image based on one or more parameters of the one or more depth sensors. Upon generating, the method comprises estimating a minimum bounding rectangle figure for the contour of the open carton box. The minimum bounding rectangle figure encloses the contour and is represented as a two-dimensional image. Thereafter, the method comprises determining a width, and a length for the open carton box by extracting vertices of the minimum bounding rectangle figure. The width, the length and the height of the open carton box is used to obtain the dimensions of the open carton box.

In an embodiment, the present disclosure relates to a dimension determination system for determining dimensions of a carton box. The dimension determination system includes a processor and a memory communicatively coupled to the processor. The memory stores processor-executable instructions, which on execution cause the processor to determine dimensions of a carton box. The dimension determination system receives a plurality of data points associated with an open carton box placed on a surface using one or more depth sensors. The one or more depth sensors are located vertically above the surface. Upon receiving, the dimension determination system extracts depth data points from the plurality of data points. The depth data points are clustered based on closeness between the depth data points using a clustering technique to identify a plurality of flaps for the open carton box. The plurality of flaps of the open carton box is represented as three-dimensional coordinate points. Upon extracting, the dimension determination system determines a height of the open carton box by determining a cross section of the open carton box using the depth data points. Upon determining, the dimension determination system generates a contour for the open carton box by converting the three-dimensional coordinate points of the plurality of flaps into a two-dimensional image based on one or more parameters of the one or more depth sensors. Upon generating, the dimension determination system estimates a minimum bounding rectangle figure for the contour of the open carton box. The minimum bounding rectangle figure encloses the contour and is represented as a two-dimensional image. Thereafter, the dimension determination system determines a width, and a length for the open carton box by extracting vertices of the minimum bounding rectangle figure. The width, the length and the height of the open carton box is used to obtain the dimensions of the open carton box.

In an embodiment, the present disclosure relates to a non-transitory computer readable medium including instructions stored thereon that when processed by at least one processor may cause a dimension determination system to receive a plurality of data points associated with an open carton box placed on a surface using one or more depth sensors. The one or more depth sensors are located vertically above the surface. Upon receiving, the instruction causes the processor to extract depth data points from the plurality of data points. The depth data points are clustered based on closeness between the depth data points using a clustering technique to identify a plurality of flaps for the open carton box. The plurality of flaps of the open carton box is represented as three-dimensional coordinate points. Upon extracting, the instruction causes the processor to determine a height of the open carton box by determining a cross section of the open carton box using the depth data points. Upon determining, the instruction causes the processor to generate a contour for the open carton box by converting the three-dimensional coordinate points of the plurality of flaps into a two-dimensional image based on one or more parameters of the one or more depth sensors. Upon generating, the instruction causes the processor to estimate a minimum bounding rectangle figure for the contour of the open carton box. The minimum bounding rectangle figure encloses the contour and is represented as a two-dimensional image. Thereafter, the instruction causes the processor to determine a width, and a length for the open carton box by extracting vertices of the minimum bounding rectangle figure. The width, the length and the height of the open carton box is used to obtain the dimensions of the open carton box.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 4 illustrates a flow diagram showing exemplary method for determining dimensions of a carton box, in accordance with some embodiments of present disclosure.

Figure 1:
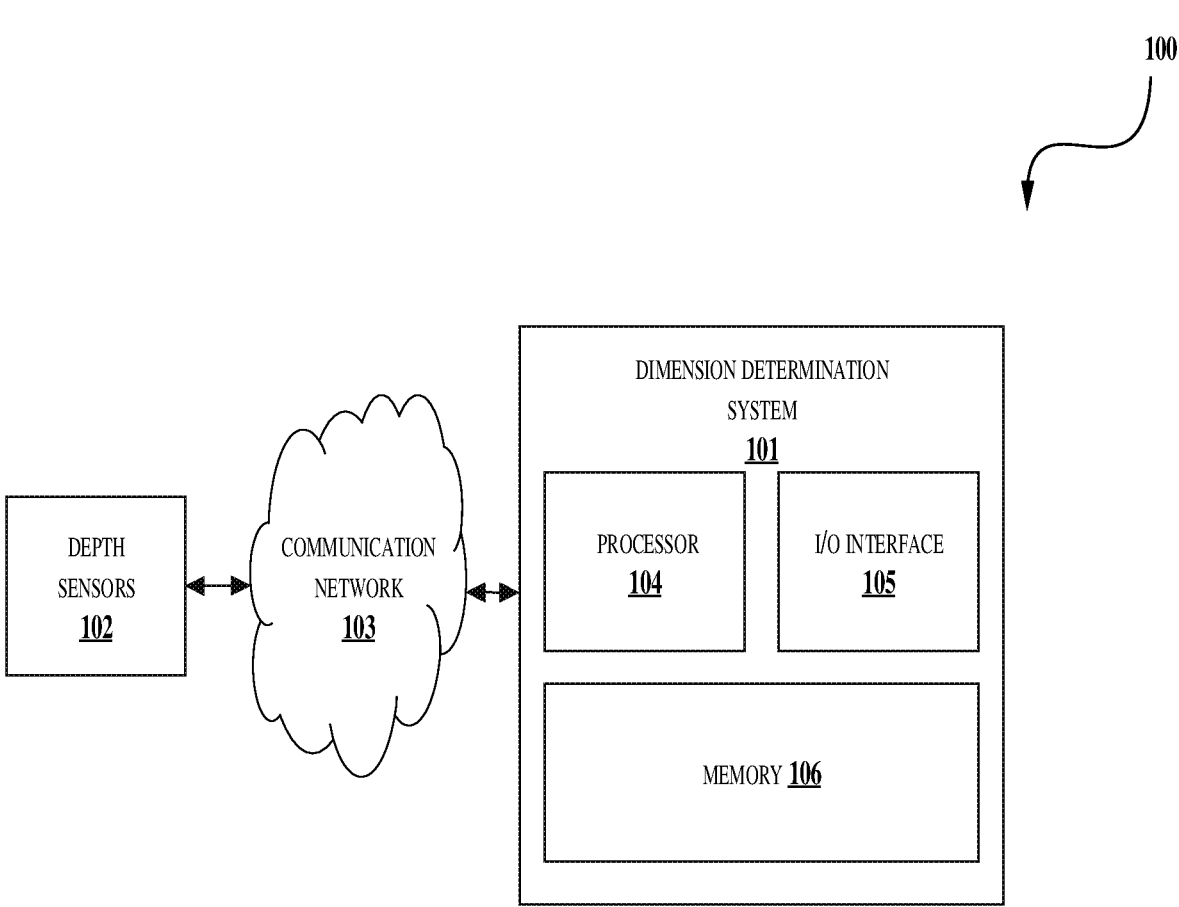
FIG. 1 shows an exemplary environment for determining dimensions of a carton box, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and dimension determination system for determining dimensions of a carton box. Generally, in warehouses, packaging, and logistic domains, the dimensions of the carton boxes are measured manually for packing of items. Measuring the carton boxes manually is time consuming and prone to errors. To overcome this problem, the present disclosure determines dimensions of an open carton box by utilizing one or more depth sensors. The present disclosure receives plurality of data points associated with the open carton box from the one or more depth sensors and identifies a plurality of flaps of the open carton box by extracting and clustering depth data points. Further, the present disclosure determines height of the open carton box by using the depth data points and estimates a minimum bounding rectangle figure for the open carton box. The present disclosure utilizes the rectangle figure to determine width and length of the open carton box. Thereafter, the present disclosure may utilize the height, width, and the length to compute a volume of the open carton box. Thus, the present disclosure reduces the time consumption by automatically determining the dimensions of the open carton box. Also, the present disclosure is able to perform efficient packing of items based on the computed dimension.

FIG. 1 shows an exemplary environment 100 for determining dimensions of a carton box. The exemplary environment 100 includes a dimension determination system 101 connected with depth sensors 102 (hereafter referred as one or more depth sensors 102). In an embodiment, the one or more depth sensors 102 may be three-dimensional (3D) range finder to acquire multi-point distance information across a wide Field-of-View (FoV). The one or more depth sensors 102 may be located vertically above a surface where an open carton box may be placed. The one or more depth sensors 102 may be used to capture frames or videos of a scene in which the open carton box is placed along with depth information. In an embodiment, the one or more depth sensors 102 may interact with the dimension determination system 101 via a communication network 103 for determining dimensions of the open carton box. The dimension determination system 101 may include, but not limited to, a laptop computer, a desktop computer, a Personal Computer (PC), a notebook, a smartphone, a tablet, e-book readers, a server, a network server, a cloud-based server, and the like.

Further, the dimension determination system 101 may include a processor 104, a I/O interface 105, and a memory 106. In some embodiments, the memory 106 may be communicatively coupled to the processor 104. The memory 106 stores instructions, executable by the processor 104, which, on execution, may cause the dimension determination system 101 to determine dimensions of the open carton box, as disclosed in the present disclosure.

In an embodiment, the communication network 103 may include, without limitation, a direct interconnection, Local Area Network (LAN), Wide Area Network (WAN), Controller Area Network (CAN), wireless network (e.g., using a Wireless Application Protocol), the Internet, and the like.

Typically, in packing or logistic domains, various items need to be packed in an efficient manner into carton box. For this purpose, the carton box needs to be measured for packing the items into the carton box based on dimensions of the carton box. For example, consider that chocolates bars need to be packed in multiple open carton boxes before shipping to various locations. As such, the dimensions of the open carton boxes are required to be computed. During computing the dimensions of the open carton box, the open carton box is placed with its flaps lowered to sides on a surface. In an embodiment, multiple open carton boxes may be placed on the surface for determining dimensions of each open carton box simultaneously. In an embodiment, when multiple open carton boxes are placed on the surface, they should be separated and placed at a predefined distance from each other. The surface on which the open carton box is placed may include, a floor, a palette, a conveyor belt, and the like. A person skilled in the art may appreciate that the surface may include any other surface other than above mentioned surfaces for placing the open carton box. In an embodiment, the open carton box is placed in such a way that the one or more depth sensors 102 are located vertically above the open carton box. Upon placing the open carton box, the dimension determination system 101 may receive a plurality of data points associated with the open carton box using the one or more depth sensors 102. The plurality of data points is a point cloud data collected for a given geographical area, terrain, building, space, object, and the like. The one or more depth sensors 102 captures Red Green Blue (RGB) data along with the depth information. A person skilled in the art will appreciate that any method other than the above-mentioned method may be used for receiving the plurality of data points of the open carton box. In an embodiment, upon receiving the plurality of data points, the dimension determination system 101 may calibrate the surface on which the open carton box is placed using data obtained from the one or more depth sensors 102. The calibration is performed to remove data points associated with the surface. Upon receiving the plurality of data points, the dimension determination system 101 may extract depth data points from the plurality of data points. The depth data points are clustered based on closeness between the depth data points using a clustering technique to identify a plurality of flaps of the open carton box (i.e., depth data points which are in close proximity to each other to form clusters). For example, flaps of the open carton box form a cluster using the clustering technique. In an embodiment, the closeness between the depth data points is determined based on a depth difference and a distance between the depth data points. The plurality of flaps of the open carton box is represented as three-dimensional coordinate points. In an embodiment, the dimension determination system 101 may validate the depth data points of the plurality of flaps by detecting a plurality of corner points of the open carton box using a trained Neural Network (NN) model. Upon detecting, the dimension determination system 101 may compare the plurality of corner points of the open carton box with the three-dimensional coordinate points of the plurality of flaps.

Upon extracting the depth data points, the dimension determination system 101 determines a height of the open carton box by determining a cross section of the open carton box using the depth data points. The cross section of the open carton box is determined by segmenting the depth data points based on the highest point of the open carton box (i.e., the depth data points are sliced at a small height/predefined height from topmost point of the open carton box). The height of the open carton box is determined based on a difference between the highest point of the open carton box and the lowest point of the open carton box obtained from the cross section. The highest point represents a rim of the open carton box, and the lowest point is obtained from a central area of the open carton box. Upon determining the height, the dimension determination system 101 generates a contour for the open carton box by converting the three-dimensional coordinate points of the plurality of flaps into a two-dimensional image based on one or more parameters of the one or more depth sensors 102. The one or more parameters may include, but is not limited to, focal length, aperture, field-of-view, and resolution of the one or more depth sensors 102.

Further, the dimension determination system 101 estimates a minimum bounding rectangle figure for the contour of the open carton box. The minimum bounding rectangle figure encloses the contour and is represented as a two-dimensional image. The two-dimensional image of the minimum bounding rectangle figure is determined using one or more fitting techniques. The one or more fitting techniques may include, but not limited to, rectangle fitting algorithm, and the like. Upon estimating, the dimension determination system 101 determines a width, and a length for the open carton box by extracting vertices of the minimum bounding rectangle figure. Particularly, the dimension determination system 101 may convert vertices of the two-dimensional image of the minimum bounding rectangle figure into three-dimensional coordinate points of the minimum bounding rectangle figure based on the one or more parameters of the one or more depth sensors 102. Upon converting, the dimension determination system 101 determines the width and the length for the open carton box by computing Euclidean distance between consecutive sets of the three-dimensional coordinate points of the vertices. Thereafter, the width, the length and the height of the open carton box is used to obtain the dimensions of the open carton box.

Figure 2:
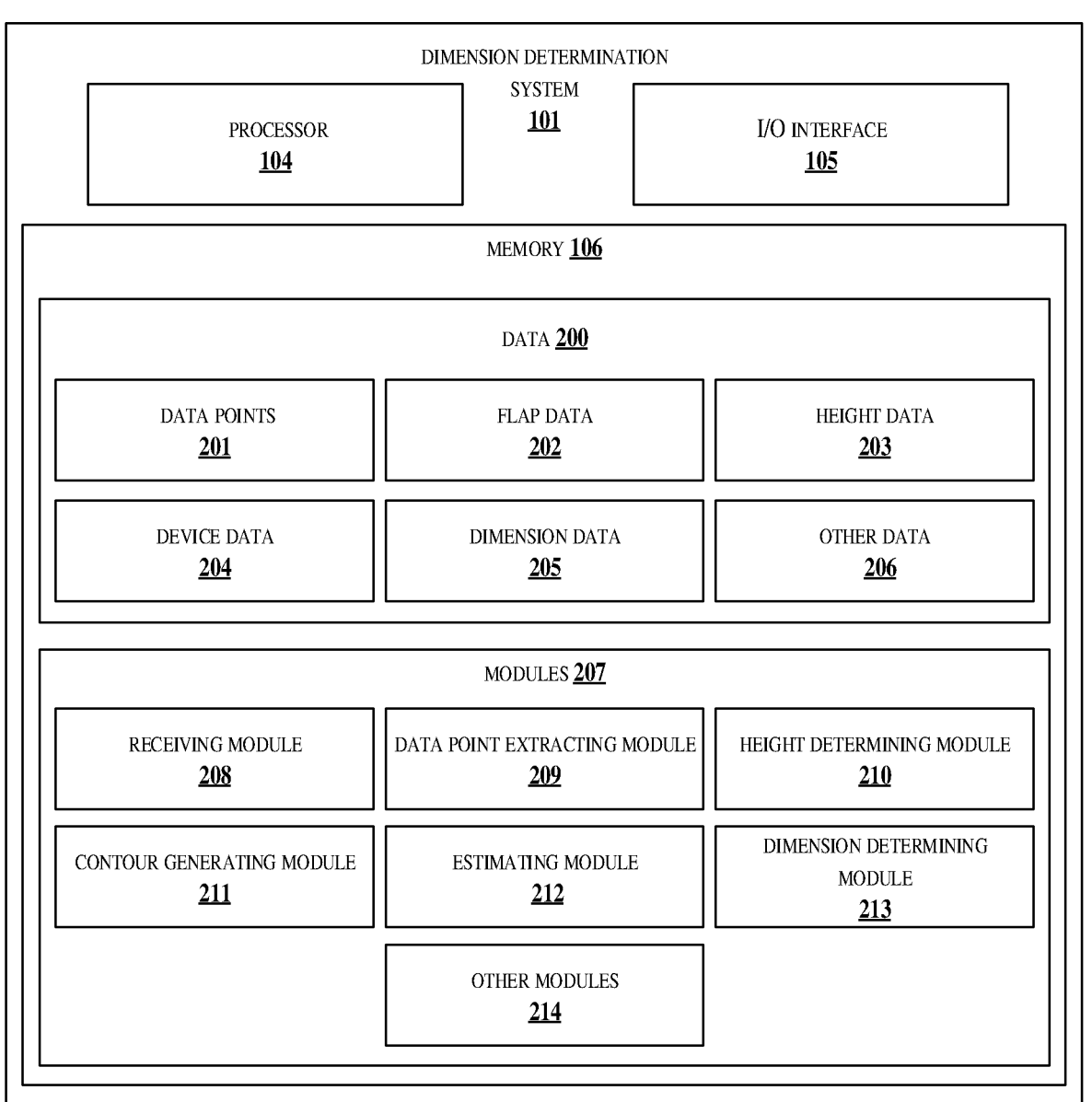
FIG. 2 shows a detailed block diagram of a dimension determination system for determining dimensions of a carton box, in accordance with some embodiments of the present disclosure.

FIG. 2 shows a detailed block diagram of a dimension determination system for determining dimensions of a carton box, in accordance with some embodiments of the present disclosure.

Data 200 and one or more modules 207 in the memory 106 of the dimension determination system 101 is described herein in detail.

In an embodiment, data 200 in the memory 106 may include data points 201, flap data 202, height data 203, device data 204, dimension data 205, and other data 206 associated with the dimension determination system 101.

In one implementation, one or more modules 207 may include, but are not limited to, a receiving module 208, a data point extracting module 209, a height determining module 210, a contour generating module 211, an estimating module 212, a dimension determining module 213 and other modules 214, associated with the dimension determination system 101.

In an embodiment, the data 200 in the memory 106 may be processed by the one or more modules 207 of the dimension determination system 101. The one or more modules 207 may be configured to perform the steps of the present disclosure using the data 200, for determining dimensions of the carton box. In an embodiment, each of the one or more modules 207 may be a hardware unit which may be outside the memory 106 and coupled with the dimension determination system 101. In an embodiment, the one or more modules 207 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 207 of the dimension determination system 101 function to determine dimensions of the carton box. The one or more modules 207 along with the data 200, may be implemented in any system, for determining dimensions of the carton box.

The data points 201 may include plurality of data points associated with the open carton box. The data points 201 may also include depth data points extracted from the plurality of data points.

The flap data 202 may include data points related to the plurality of flaps of the open carton box identified by clustering the depth data points.

The height data 203 may include data related to the height of the open carton box determined using the depth data points.

The device data 204 may include one or more parameters of the one or more depth sensors 102. The one or more parameters may include focal length, aperture, field-of-view, and resolution of the one or more depth sensors 102.

The dimension data 205 may include details about width and the length of the open carton box determined by extracting vertices of the minimum bounding rectangle.

The other data 206 may store data, including temporary data and temporary files, generated by modules for performing the various functions of the dimension determination system 101.

The receiving module 208 may receive the plurality of data points associated with the open carton box placed on the surface using the one or more depth sensors 102. Upon receiving the plurality of data points, the data point extracting module 209 may extract the depth data points from the plurality of data points. The depth data points are clustered based on closeness between the depth data points using the clustering technique to identify the plurality of flaps for the open carton box. For example, the data point extracting module 209 may extract a group of data points which are in close proximity to each other to form clusters. The plurality of flaps of the open carton box is represented as three-dimensional coordinate points. Initially, all the data points of the plurality of data points are first arranged into a three-dimensional grid using fixed width boxes. Further, a volumetric representation of the data points is performed and an empty list of clusters in created. All the data points of the plurality of data points are maintained in a queue. For every data point in the queue, all the other data points that are within a sphere of a fixed radius are grouped together by the data point extracting module 209. In an embodiment, the process of grouping is repeated until all the data points within the queue have been processed. The data points grouped together to form the flaps of the open carton box.

Upon extracting the depth data points and identifying the plurality of flaps, the height determining module 210 determines a height of the open carton box by determining a cross section of the open carton box using the depth data points. In an embodiment, the cross section of the complete open carton box is obtained by slicing the depth data points at a small height from the topmost point of the open carton box. In an embodiment, the cross section contains a base of the open carton box along with walls and flaps of the open carton box. The height of the open carton box is determined based on the difference between the highest point of the open carton box and the lowest point of the open carton box obtained from the cross section. The highest point represents the rim of the open carton box, and the lowest point is obtained from the central area of the open carton box.

Upon determining the height, the contour generating module 211 generates a contour for the open carton box by converting the three-dimensional coordinate points of the plurality of flaps into a two-dimensional image based on the one or more parameters of the one or more depth sensors 102. For example, the 3D coordinates points which makes the plurality of flaps of the open carton box are projected into a 2D image using the one or more parameters such as focal length, aperture, and the like. The below equations 1 and 2 are used to convert the 3D coordinates points into 2D image.

$$u = (X * fx/\text{depth}) + cx \tag{1}$$

$$v = (Y * fy/\text{depth}) + cy \tag{2}$$

wherein, u and v=pixel coordinates; and fx, fy, cx, cy=one or more parameters of the one or more depth sensors 102.

Upon generating the contour, the estimating module 212 may estimate a minimum bounding rectangle figure for the contour of the open carton box. The minimum bounding rectangle figure encloses the contour and is represented as a two-dimensional image. In an embodiment, a rectangle fitting algorithm is applied to estimate the minimum bounding rectangle figure over the contour of the open carton box interior. The corners of the rectangle coincide with the corners of the open carton box. In an embodiment, the estimating module 212 converts the corner points of the two-dimensional image of the minimum bounding rectangle figure into three-dimensional coordinate points of the minimum bounding rectangle figure based on the one or more parameters of the one or more depth sensors 102. The below equations 3 and 4 are used to convert the 2D image of the rectangle figure into 3D coordinate points.

$$X = (u - cx) * Z/fx \qquad (3)$$

$$Y = (v - cy) * Z/fy \qquad (4)$$

wherein,

Z=Depth at pixel location (u,v) in the depth image/2D image;

u and v=pixel coordinates;

fx, fy, cx, cy=one or more parameters of the one or more depth sensors 102.

Upon estimating the minimum bounding rectangle figure, the dimension determining module 213 may determine a width, and a length for the open carton box by extracting vertices of the minimum bounding rectangle figure as disclosed in above step. In an embodiment, each pair of adjacent corners of the rectangle figure forms the sides of the open carton box. The Euclidean distance between the corners that form the edges of the open carton box provide the length and the width. Further, the dimension determining module 213 utilizes the width, the length, and the height of the open carton box to obtain the dimensions of the open carton box. In an embodiment, the dimensions of the open carton box are provided to a packing optimizer for deciding order and direction in which objects/items are to be packed. In an embodiment, input from the packaging optimizer is provided to a robotic manipulator to pack the objects efficiently into the carton box.

The one or more modules 207 may also include other modules 214 such as a calibration module and a validation module, to perform various miscellaneous functionalities of the dimension determination system 101. In an embodiment, the calibration module may receive the plurality of data points from the receiving module 208. Upon receiving, the calibration module may calibrate the surface on which the open carton box is placed using the r data received from the one or more depth sensors 102. The calibration of the surface is performed to remove data points associated with the surface. In an embodiment, the calibration of the surface is performed by taking depth reading from the one or more depth sensors 102 at various points on the surface and averaging the depths. In an embodiment, the calibration enables depth slicing to remove the plane area/surface area from the plurality of data points. In an embodiment, the one or more depth sensors 102 may include a User Interface (UI) or an Application Programming Interface (API) through which the plurality of data points can be obtained. In an embodiment, the validation module may validate the depth data points of the plurality of flaps. The validation module detects a plurality of corner points of the open carton box along with detected boundary of the open carton box using a trained neural network model. Upon detecting, the validation module compares the plurality of corner points of the open carton box with the three-dimensional coordinate points of the plurality of flaps. The comparison is performed for example using a Euclidean distance between the corner points of the open carton box and closest point in the cluster. In an embodiment, if the Euclidean distance is found to be less than a set threshold, a re-computation is performed for identifying the plurality of flaps. In an embodiment, the neural network model is trained to detect inner bottom and outer top boundary of the open carton box, along with its corner points. The training of the neural network model is performed by first clicking many pictures of the open carton box placed in different positions and orientations. The pictures are then manually annotated/labelled by marking the boundaries and corner points of each carton box that is present in each image. These labelled images are fed to the neural network/deep learning model. The neural network model may include, but is not limited to, Region-based Convolutional Neural Network (R2CNN++), Long Short-Term Memory Networks (LSTMs), Recurrent Neural Networks (RNN), and the like. In an embodiment, the detection is performed with the neural network model on colour images of a scene, to detect one or more carton boxes placed in the scene. The detected points from the colour images can be used to re-verify the clusters obtained in the above step, and discard any of the incorrect clusters. It will be appreciated that such modules may be represented as a single module or a combination of different modules.

Figure 3:
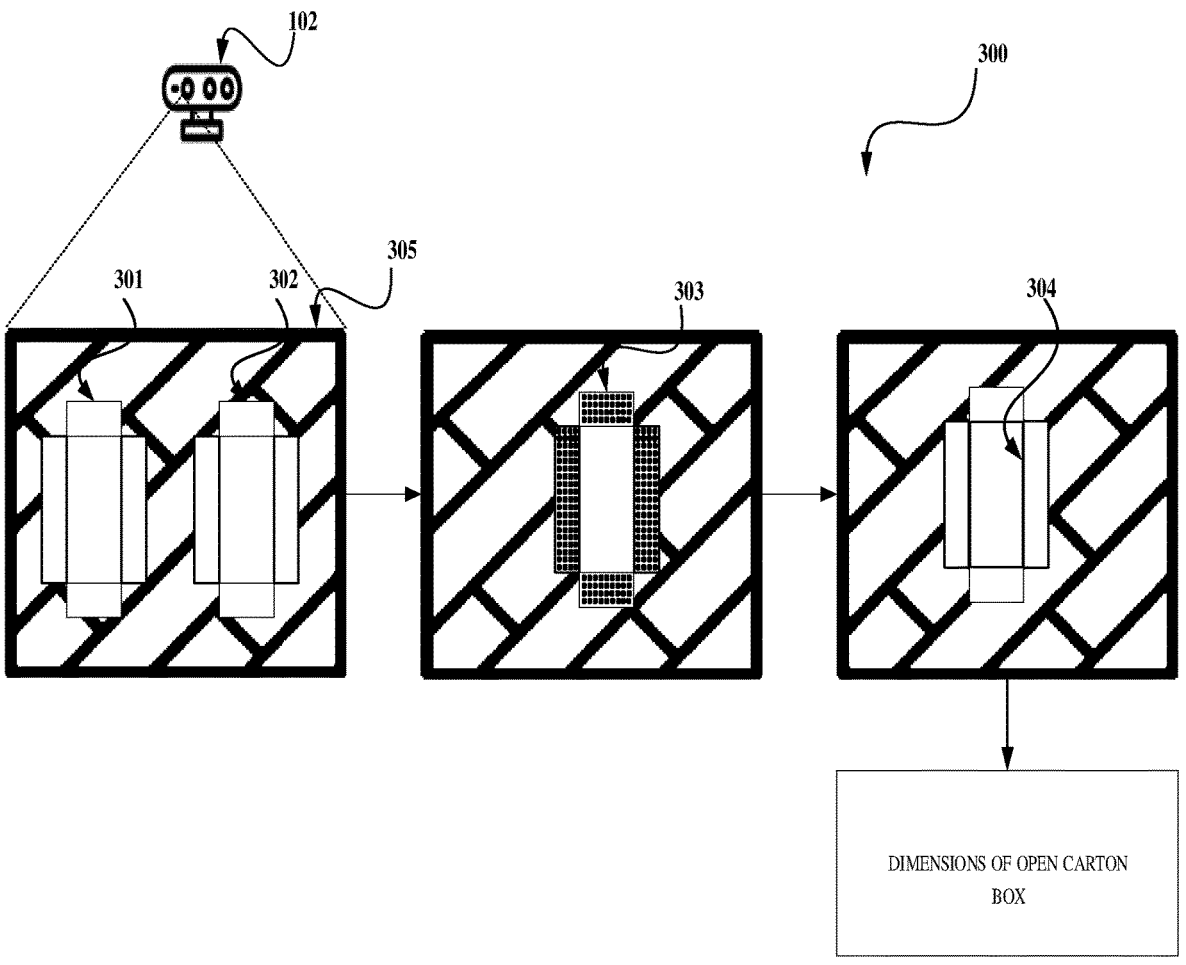
FIG. 3 shows exemplary embodiments for determining dimensions of an open carton box, in accordance with some embodiments of present disclosure.

FIG. 3 shows exemplary embodiments for determining dimensions of an open carton box, in accordance with some embodiments of present disclosure. FIG. 3 shows an environment 300 which includes a first open carton box 301, a second open carton box 302, a surface 305 and the one or more depth sensors 102. The first open carton box 301 and the second open carton box 302 are placed on the surface 305 such as a floor. The one or more depth sensors 102 are located vertically above the surface 305 such as on a ceiling or roof. A person skilled in the art may appreciate that the one or more depth sensors 102 may be located in any suitable place for capturing the plurality of data points of the open carton box. In the current context, the dimension determination system 101 receives the plurality of data points associated with the first open carton box 301 and the second open carton box 302 placed on the surface 305. The dimension determination system 101 extracts the depth data points from the plurality of data points to form clusters based on the closeness between the depth data points using clustering technique to identify the plurality of flaps. For example, for the first open carton box 301, the identified plurality of flaps is shown as 303 in FIG. 3. The plurality of flaps of the first open carton box 301 is represented as three-dimensional coordinate points for determining the height of the first open carton box 301. Upon extracting the plurality of flaps, the height of the first open carton box 301 is determined by determining a cross section of the first open carton box 301 using the depth data points i.e., the plurality of flaps 303 is sliced to obtain highest point and the lowest point of the first open carton box 301. The difference between the highest point and the lowest point results in obtaining the height of the first open carton box 301.

Further, upon obtaining the height, a contour for the first open carton box 301 is generated by converting the three-dimensional coordinate points of the plurality of flaps into a two-dimensional image based on the one or more parameters of the one or more depth sensors 102. The contour represents the outline/boundary of the first open carton box 301. Upon generating the contour, a rectangular figure is estimated for the contour of the first open carton box 301. The rectangular figure encloses the contour and is represented as a two-dimensional image. The rectangular figure enclosing the first open carton box 301 is shown as 304 in FIG. 3. The rectangular FIG. 304 contains four corners. Each pair of adjacent corners forms the sides of the first open carton box 301. The Euclidean distance between the corners that forms the sides/edges of the first open carton box 301 provides the length and the width of the first open carton box 301. The width, the length, and the height of the first open carton box 301 is used to obtain the dimensions and compute the volume of the first open carton box 301 for packing items in the first open carton box 301. Similarly, the dimensions of the second open carton box 302 is determined by the dimension determination system 101.

FIG. 4 illustrates a flow diagram showing exemplary method for determining dimensions of a carton box, in accordance with some embodiments of present disclosure.

As illustrated in FIG. 4, the method 400 may include one or more blocks for executing processes in the dimension determination system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, receiving, by the receiving module 208, the plurality of data points associated with the open carton box placed on the surface using the one or more depth sensors 102. The one or more depth sensors 102 are located vertically above the surface.

At block 402, extracting, by the data point extracting module 209, the depth data points from the plurality of data points. The depth data points are clustered based on the closeness between the depth data points using the clustering technique to identify the plurality of flaps for the open carton box. The plurality of flaps of the open carton box is represented as three-dimensional coordinate points.

At block 403, determining, by the height determining module 210, the height of the open carton box by determining the cross section of the open carton box using the depth data points. The cross section of the open carton box is determined by segmenting the depth data points based on the highest point of the open carton box. The height of the open carton box is determined based on the difference between the highest point of the open carton box and the lowest point of the open carton box obtained from the cross section. The highest point represents the rim of the open carton box, and the lowest point is obtained from the central area of the open carton box.

At block 404, generating, by the contour generating module 211, the contour for the open carton box by converting the three-dimensional coordinate points of the plurality of flaps into the two-dimensional image based on the one or more parameters of the one or more depth sensors 102. The one or more parameters comprises focal length, aperture, field-of-view, and resolution of the one or more depth sensors 102.

At block 405, estimating, by the estimating module 212, the minimum bounding rectangle figure for the contour of the open carton box. The minimum bounding rectangle figure encloses the contour and is represented as the two-dimensional image. The two-dimensional image of the minimum bounding rectangle figure is determined using the one or more fitting techniques.

At block 406, determining, by the dimension determining module 213, the width, and the length for the open carton box by extracting vertices of the minimum bounding rectangle figure. Particularly, the two-dimensional image of the minimum bounding rectangle figure is converted into the three-dimensional coordinate points of the minimum bounding rectangle figure based on the one or more parameters of the one or more depth sensors 102. Further, the width, the length and the height of the open carton box is used to obtain the dimensions of the open carton box.

Computing System

Figure 5:
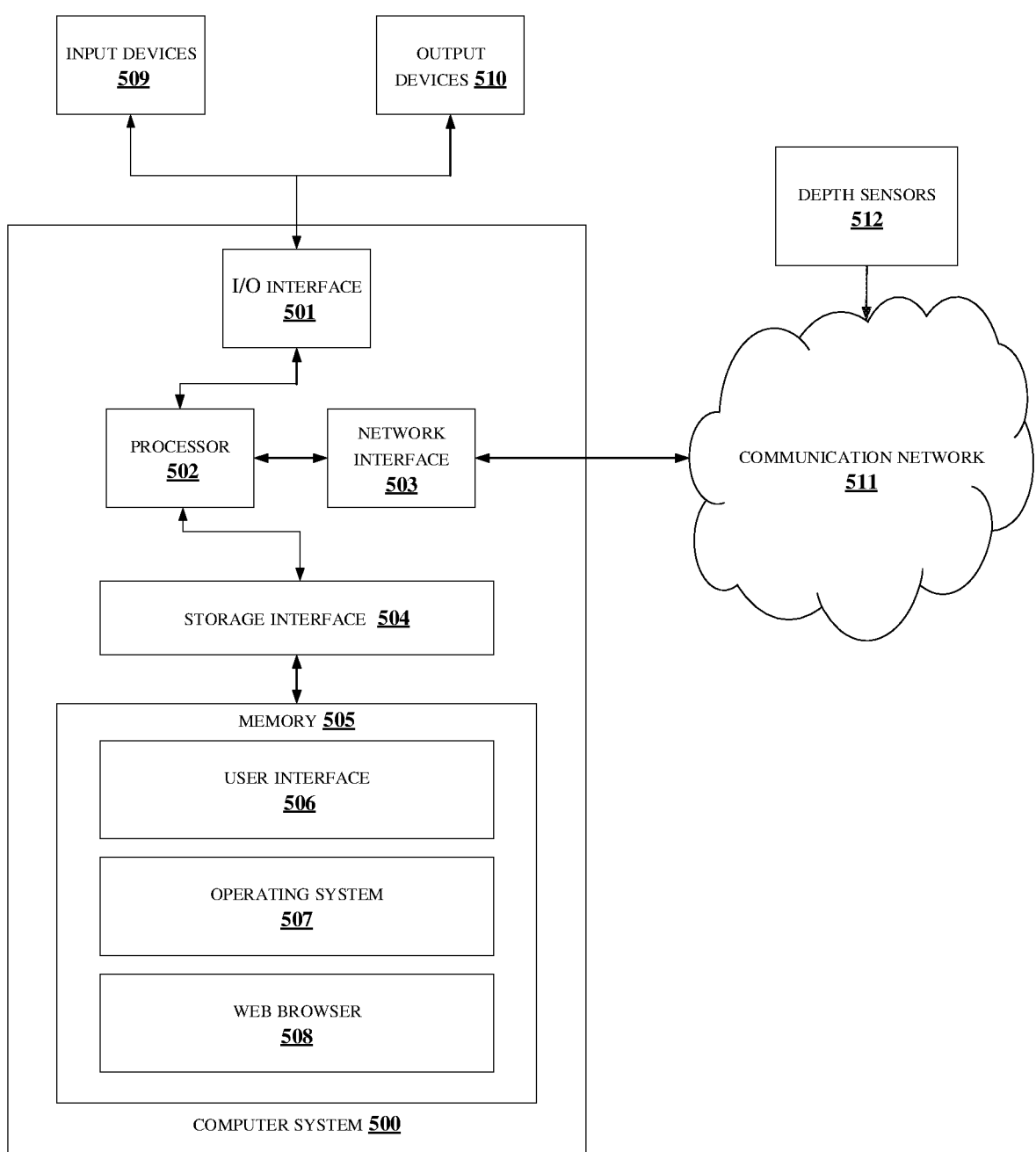
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the dimension determination system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the dimension determination system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with depth sensors 512 for determining dimensions of the carton box. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft.NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for automatically determining dimensions of the open carton boxes without the need for manual measurement of the dimensions.

An embodiment of the present disclosure reduces time consumption required for manually measuring the dimensions of the carton box and avoids any error caused due to manual measurement.

An embodiment of the present disclosure may be used with any setup for determining dimensions of the carton box.

An embodiment of the present disclosure provides accurate measurements of the dimensions as the neural network model is used for verifying the extracted depth data points.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Dimension determination system |
| 102 | Depth sensors |
| 103 | Communication network |
| 104 | Processor |

-continued

| Reference Number | Description |
| --- | --- |
| 105 | I/O interface |
| 106 | Memory |
| 200 | Data |
| 201 | Data points |
| 202 | Flap data |
| 203 | Height data |
| 204 | Device data |
| 205 | Dimension data |
| 206 | Other data |
| 207 | Modules |
| 208 | Receiving module |
| 209 | Data point extracting module |
| 210 | Height determining module |
| 211 | Contour generating module |
| 212 | Estimating module |
| 213 | Dimension determining module |
| 214 | Other modules |
| 301 | First open carton box |
| 302 | Second open carton box |
| 303 | Plurality of flaps |
| 304 | Rectangle figure |
| 305 | Surface |
| 500 | Computer system |
| 501 | I/O Interface |
| 502 | Processor |
| 503 | Network interface |
| 504 | Storage interface |
| 505 | Memory |
| 506 | User interface |
| 507 | Operating system |
| 508 | Web browser |
| 509 | Input devices |
| 10 | Output devices |
| 511 | Communication network |
| 512 | Depth sensors |

What is claimed is:

1. A method of determining dimensions of a carton box, the method comprising:

receiving, by a processor of a dimension determination system, a plurality of data points associated with an open carton box placed on a surface using one or more depth sensors, wherein the one or more depth sensors are located vertically above the surface;

extracting, by the processor of the dimension determination system, depth data points from the plurality of data points, wherein the depth data points are clustered based on closeness between the depth data points using a clustering technique to identify a plurality of flaps for the open carton box, and wherein the plurality of flaps of the open carton box is represented as three-dimensional coordinate points;

determining, by the processor of the dimension determination system, a height of the open carton box by determining a cross section of the open carton box using the depth data points, wherein the height is determined based on a difference between a highest point of the open carton box, representing a rim of the open carton box, and a lowest point of the open carton box obtained from a central area of the open carton box, using the cross section, and wherein the cross section of the open carton box is determined by segmenting the depth data points based on the highest point of the open carton box;

generating, by the processor of the dimension determination system, a contour for the open carton box by converting the three-dimensional coordinate points of the plurality of flaps into a two-dimensional image based on one or more parameters of the one or more depth sensors;

estimating, by the processor of the dimension determination system, a minimum bounding rectangle figure for the contour of the open carton box, wherein the minimum bounding rectangle figure encloses the contour and is represented as a two-dimensional image; and determining, by the processor of the dimension determination system, a width and a length for the open carton box by extracting vertices of the minimum bounding rectangle figure, wherein the width, the length and the height of the open carton box is used to obtain the dimensions of the open carton box.

2. The method as claimed in claim 1, wherein the closeness between the depth data points is determined based on a depth difference and a distance between the depth data points.

3. The method as claimed in claim 1 and further comprising:

validating the depth data points of the plurality of flaps by:

detecting, by the processor of the dimension determination system, a plurality of corner points of the open carton box using a trained Neural Network (NN) model; and comparing, by the processor of the dimension determination system, the plurality of corner points of the open carton box with the three-dimensional coordinate points of the plurality of flaps.

4. The method as claimed in claim 1, wherein extracting the vertices of the minimum bounding rectangle figure comprises:

converting, by the processor of the dimension determination system, the two-dimensional image of the minimum bounding rectangle figure into three-dimensional coordinate points of the minimum bounding rectangle figure based on the one or more parameters of the one or more depth sensors.

5. The method as claimed in claim 1, wherein the one or more parameters comprises focal length, aperture, field-of-view, and resolution of the one or more depth sensors.

6. The method as claimed in claim 1, wherein the two-dimensional image of the minimum bounding rectangle figure is determined using one or more fitting techniques.

7. The method as claimed in claim 1, wherein receiving the plurality of data points further comprises:

calibrating, by the processor of the dimension determination system, the surface on which the open carton box is placed using sensor data obtained from the one or more depth sensors, wherein calibration is performed to remove the depth data points from the plurality of data points, associated with the surface.

8. A dimension determination system for determining dimensions of a carton box, comprising:

a processor; and a memory communicatively coupled to the processor, wherein the memory stores processor-executable instructions, which, on execution, cause the processor to:

receive a plurality of data points associated with an open carton box placed on a surface using one or more depth sensors, wherein the one or more depth sensors are located vertically above the surface;

extract depth data points from the plurality of data points, wherein the depth data points are clustered based on closeness between the depth data points using a clustering technique to identify a plurality of flaps for the open carton box, and wherein the plurality of flaps of the open carton box is represented as three-dimensional coordinate points;

determine a height of the open carton box by determining a cross section of the open carton box using the depth data points, wherein the height is determined based on a difference between a highest point of the open carton box, representing a rim of the open carton box, and a lowest point of the open carton box obtained from a central area of the open carton box, using the cross section, and wherein the cross section of the open carton box is determined by segmenting the depth data points based on the highest point of the open carton box;

generate a contour for the open carton box by converting the three-dimensional coordinate points of the plurality of flaps into a two-dimensional image based on one or more parameters of the one or more depth sensors;

estimate a minimum bounding rectangle figure for the contour of the open carton box, wherein the minimum bounding rectangle figure encloses the contour and is represented as a two-dimensional image, and wherein the two-dimensional image of the minimum bounding rectangle figure is determined using one or more fitting techniques; and determine a width and a length for the open carton box by extracting vertices of the minimum bounding rectangle figure, wherein the width, the length and the height of the open carton box is used to obtain the dimensions of the open carton box.

9. The dimension determination system as claimed in claim 8, wherein the closeness between the depth data points is determined based on a depth difference and a distance between the depth data points.

10. The dimension determination system as claimed in claim 8, wherein the processor is configured to:

validate the depth data points of the plurality of flaps by:

detecting a plurality of corner points of the open carton box using a trained Neural Network (NN) model; and comparing the plurality of corner points of the open carton box with the three-dimensional coordinate points of the plurality of flaps.

11. The dimension determination system as claimed in claim 8, wherein the processor extracts the vertices of the minimum bounding rectangle figure by:

converting the two-dimensional image of the minimum bounding rectangle figure into three-dimensional coordinate points of the minimum bounding rectangle figure based on the one or more parameters of the one or more depth sensors.

12. The dimension determination system as claimed in claim 8, wherein the one or more parameters comprises focal length, aperture, field of view, and resolution of the one or more depth sensors.

13. The dimension determination system as claimed in claim 8, wherein the two-dimensional image of the minimum bounding rectangle figure is determined using one or more fitting techniques.

14. The dimension determination system as claimed in claim 8, wherein the processor receives the plurality of data points by:

calibrating the surface on which the open carton box is placed using sensor data obtained from one or more sensors, wherein calibration is performed to remove the depth data points associated with the surface.

15. A non-transitory computer readable medium including instruction stored thereon that when processed by at least one processor cause a dimension determination system to perform operation comprising:

receiving a plurality of data points associated with an open carton box placed on a surface using one or more depth sensors, wherein the one or more depth sensors are located vertically above the surface;

extracting depth data points from the plurality of data points, wherein the depth data points are clustered based on closeness between the depth data points using a clustering technique to identify a plurality of flaps for the open carton box, and wherein the plurality of flaps of the open carton box is represented as three-dimensional coordinate points;

determining a height of the open carton box by determining a cross section of the open carton box using the depth data points, wherein the height is determined based on a difference between a highest point of the open carton box, representing a rim of the open carton box, and a lowest point of the open carton box obtained from a central area of the open carton box, using the cross section, and wherein the cross section of the open carton box is determined by segmenting the depth data points based on the highest point of the open carton box;

generating a contour for the open carton box by converting the three-dimensional coordinate points of the plurality of flaps into a two-dimensional image based on one or more parameters of the one or more depth sensors;

estimating a minimum bounding rectangle figure for the contour of the open carton box, wherein the minimum bounding rectangle figure encloses the contour and is represented as a two-dimensional image; and determining a width and a length for the open carton box by extracting vertices of the minimum bounding rectangle figure, wherein the width, the length and the height of the open carton box is used to obtain the dimensions of the open carton box.

\*   \*   \*   \*   \*